US007030522B2

(12) United States Patent
Nakajima et al.

(10) Patent No.: US 7,030,522 B2
(45) Date of Patent: Apr. 18, 2006

(54) EXCITER FOR DIRECTLY VIBRATING BOARD

(75) Inventors: Yuichi Nakajima, Kobe (JP); Kiyoshi Ohtani, Kobe (JP); Akira Nishikawa, Kobe (JP); Noboru Hidaka, Kobe (JP)

(73) Assignee: Fujitsu Ten Limited, Kobe (JP)

( * ) Notice: Subject to any disclaimer, the term of this patent is extended or adjusted under 35 U.S.C. 154(b) by 0 days.

(21) Appl. No.: 11/050,266

(22) Filed: Feb. 2, 2005

(65) Prior Publication Data

US 2005/0184607 A1 Aug. 25, 2005

(30) Foreign Application Priority Data

Feb. 20, 2004 (JP) ............................ 2004-044819

(51) Int. Cl.
*H02K 1/06* (2006.01)
*H02K 5/04* (2006.01)
*H04R 1/00* (2006.01)
*H04R 9/06* (2006.01)
*H04R 11/02* (2006.01)

(52) U.S. Cl. .......................... 310/81; 310/15; 381/389

(58) Field of Classification Search .................. 310/12, 310/15, 17, 81, 91; 381/386, 389, 395
See application file for complete search history.

(56) References Cited

U.S. PATENT DOCUMENTS 3,279,609 A * 10/1966 Francois ..................... 210/232
3,524,027 A * 8/1970 Schamp et al. ............. 381/152
3,567,870 A * 3/1971 Rivera ........................ 381/152
3,728,497 A * 4/1973 Komatsu .................... 381/392
4,045,349 A * 8/1977 Humbert, Jr. ............... 210/232
5,334,895 A * 8/1994 Morioka et al. .......... 310/67 R
5,473,700 A * 12/1995 Fenner, Jr. .................. 381/336
5,738,785 A * 4/1998 Brown et al. ............... 210/232
6,151,402 A * 11/2000 Azima et al. ............... 381/396
2005/0129265 A1* 6/2005 Nakajima et al. ........... 381/412

FOREIGN PATENT DOCUMENTS

JP 6-45865 6/1994
JP 2003-143690 5/2003

OTHER PUBLICATIONS

Patent Abstract of Japan, Publication No. 2003-143690, Published on May 16, 2003, in the name of Tashiro.

* cited by examiner

*Primary Examiner*—Darren Schuberg
*Assistant Examiner*—David W. Scheuermann
(74) *Attorney, Agent, or Firm*—Christie, Parker and Hale, LLP

(57) ABSTRACT

An exciter for directly vibrating a board, which enables a sufficient rotational torque to be obtained by a work tool at the time of attachment or detachment, provided with a magnetic circuit unit having an outside yoke comprised of a side wall and a bottom, a permanent magnet fastened to the bottom, and an inside yoke and with a coil inserted into a clearance between the side wall and inside yoke, the magnetic circuit unit being vibratably supported at the coupler member by elastic members, the coupler member being screwed with the bracket member fastened to the surface of the board, two parallel flat surfaces engaging with ends of a work tool being provided at an outer circumference of the outside yoke, and the work tool being turned to attach/detach the coupler member with respect to the bracket member.

6 Claims, 5 Drawing Sheets

EXCITER FOR DIRECTLY VIBRATING BOARD

CROSS-REFERENCE TO RELATED APPLICATION

This application claims the priority of Japanese Patent Application No. 2004-44819, filed on Feb. 20, 2004.

BACKGROUND OF THE INVENTION

1. Field of the Invention

The present invention relates to an exciter directly attached to a board for vibrating the board. In particular, the present invention relates to an exciter for directly vibrating a board which is designed so that when attached to a board via a bracket member, it will not be insufficiently fastened to the bracket member.

2. Description of the Related Art

In the past, in stereo systems, PCs, mobile phones, and other electronic apparatuses, speakers have been used to output audio information from various media. In such speakers, vibration boards for emitting sound are attached to exciters supplied with the drive signals for audio output. These vibration boards have horn shapes specially designed for such speakers. For example, the vibration boards have voice coils of exciters affixed to them. Sound is output by these voice coils vibrating by magnetic circuits.

Such speakers are also used to reproduce music or speech in vehicles, for example, the compartments of passenger cars. These speakers are for example built into the doors of the front seats or are placed on the rear trays. Usually a plurality of speakers are arranged attached to at least one of the front seat and rear seat sides.

In addition to arranging speakers for audio reproduction inside the front seat doors or on the rear trays, arrangement of speakers including direct drive exciters at the ceiling panels of the compartments has for example been disclosed in Japanese Utility Model Publication (Kokai) No. 6-45865. When attaching usual speakers in a compartment, there are restrictions on the positions of attachment of the speakers. Speakers of too large nominal sizes cannot be used. To deal with this, in the speakers proposed above, instead of the conventional speakers having large nominal sizes, exciters are directly attached to the ceiling panels and the ceiling panels are used as vibration boards.

Various exciters for directly vibrating boards able to be used for such car-mounted speakers have been proposed as disclosed for example in Japanese Unexamined Patent Publication (Kokai) No. 2003-143690. The proposed exciter for directly vibrating board is provided with a coupler member. It is for example directly fixed to a board such as an interior panel used for vehicles so as to thereby form speakers. If however the coupler member is fixed to the board, when for example the exciter is damaged and the speaker no longer function, it is not possible to replace only the exciter. That is, the entire board with the exciter attached has to be replaced.

Therefore, considering the servicing, just the exciter is made able to be replaced by fixing a bracket member to the board, attaching the exciter via the bracket member, and using the exciter to vibrate the board through the bracket member. That is, the exciter is attached to the board through the bracket member. This bracket member is shaped as a disk at the center of which a projection with male thread is provided. The coupler member is in turn provided at the center with recesses with female thread.

When the bracket member is for example fixed to the surfaces of the interior panel of vehicles, when attaching the exciter to the interior panel, the recesses formed at the coupler member and the projection of the bracket member is screwed together, that is, the exciter is turned to fasten it.

However, if workers manually turn exciters when attaching them, the fastening torques in the turning work cannot be made constant and sometimes sufficient fastening torques cannot be applied. The insufficient fastening at the time of attachment of the exciter causes loose attachment and degrades the performances of the speaker. Further, the exciters may even drop off.

To prevent insufficient fastening at the time of attachment of exciter, use of work tools such as wrenches able to easily give the required fastening torques may be considered. However, the only places for the ends of the work tools to be brought into contact with the exciter are the outer circumference of the outside yoke. The ends of the work tools end up slipping at the outer circumference, so sufficient fastening torques cannot be obtained.

On the other hand, if too strongly fastening the exciter—not only when attaching it, but also when detaching it for replacement, the ends of the work tools end up slipping at the outer circumference of the outside yoke and therefore the exciter cannot be turned.

SUMMARY OF THE INVENTION

An object of the present invention is to provide an exciter for directly vibrating a board which enables a sufficient rotational torque to be obtained by a work tool at the time of attachment or detachment.

To achieve the above object, the present invention provides an exciter for directly vibrating a board including a magnetic circuit unit having a dish-shaped outside yoke comprised of a side wall and a bottom connected with each other, a permanent magnet fastened to the bottom, and an inside yoke placed on the permanent magnet and provided with a clearance from the side wall; a coil wound around a bobbin and inserted into the clearance, which vibrates said board when a drive signal is supplied to; and a coupler member fastening the bobbin and provided with supports for supporting an elastic member connected to the magnetic circuit unit; wherein the coupler member having a mount for attachment to a bracket member attached to the surface of the board; and engagement means able to engage with a work tool being provided at the exciter for attachment/detachment of the coupler member with respect to the bracket member.

Preferably, the engagement means comprise at least one flat surface formed at an outer circumference of the side wall of the outside yoke, and, when mounting the coupler member to or detaching it from the bracket member, a flat surface is gripped by being brought into abutment with a flat surface of an end of the work tool and the work tool is turned to attach/detach the coupler member with respect to the bracket member. More preferably, the engagement means comprise at least one pair of parallel facing flat surfaces.

Alternatively, the engagement means comprise at least one groove formed at an outside surface of the bottom of the outside yoke, and, when mounting the coupler member to or detaching it from the bracket member, a groove receives an end of the work tool and the work tool is turned to attach/detach the coupler member with respect to the bracket member. More preferably, grooves are formed in a cross shape.

Alternatively, the engagement means comprise projecting parts formed at the plurality of elastic member supports supporting the elastic member and provided at the coupler member, and, when mounting the coupler member to or detaching it from the bracket member, the projecting parts are engaged with grooves provided at ends of the work tool and the work tool is turned to attach/detach the coupler member with respect to the bracket member.

As explained above, according to the present invention, it is possible to provide an exciter for directing vibrating a board utilized as a vibration board wherein the coupler member of the exciter is provided with engagement means enabling engagement with an end of a work tool when attaching the coupler member to a bracket member attached to the board or when detaching it from the bracket member, so a sufficient fastening torque can be obtained when mounting the exciter to the board and a sufficient release torque can be obtained when replacing an exciter.

Since the engagement means may be comprised of two facing flat surfaces provided at the outer circumference of the outside yoke forming part of the exciter or a groove provided on the bottom of the outside yoke, there is no need to provide any special parts and there is no effect on the performance of the exciter. It is possible to obtain a sufficient fastening torque or release torque by turning the work tool by a simple method.

Further, the engagement means may utilize the plurality of elastic member supports provided at the coupler member forming part of the exciter and form projecting parts at the elastic member supports, so it is possible to make the ends of a work tool engage with the projecting parts and possible to obtain a sufficient fastening torque or release torque.

By providing these engagement means at the exciter, the turning work is improved when attaching the exciter to the board or when detaching the exciter from the board.

BRIEF DESCRIPTION OF THE DRAWINGS

Other features, objects, and advantages of the present invention will become apparent from the following description of preferred embodiments given with reference to the drawings in which the same reference numerals designate the same or corresponding parts throughout several views, in which.

DESCRIPTION OF THE PREFERRED EMBODIMENTS

To clarify the effects given rise to by the present invention, first, the configuration of an already proposed exciter for directly vibrating a board and on which the present invention is based will be explained in detail below. A specific example of this proposed exciter will be explained with reference to FIG. 5 and FIG. 6.

Figure 5:
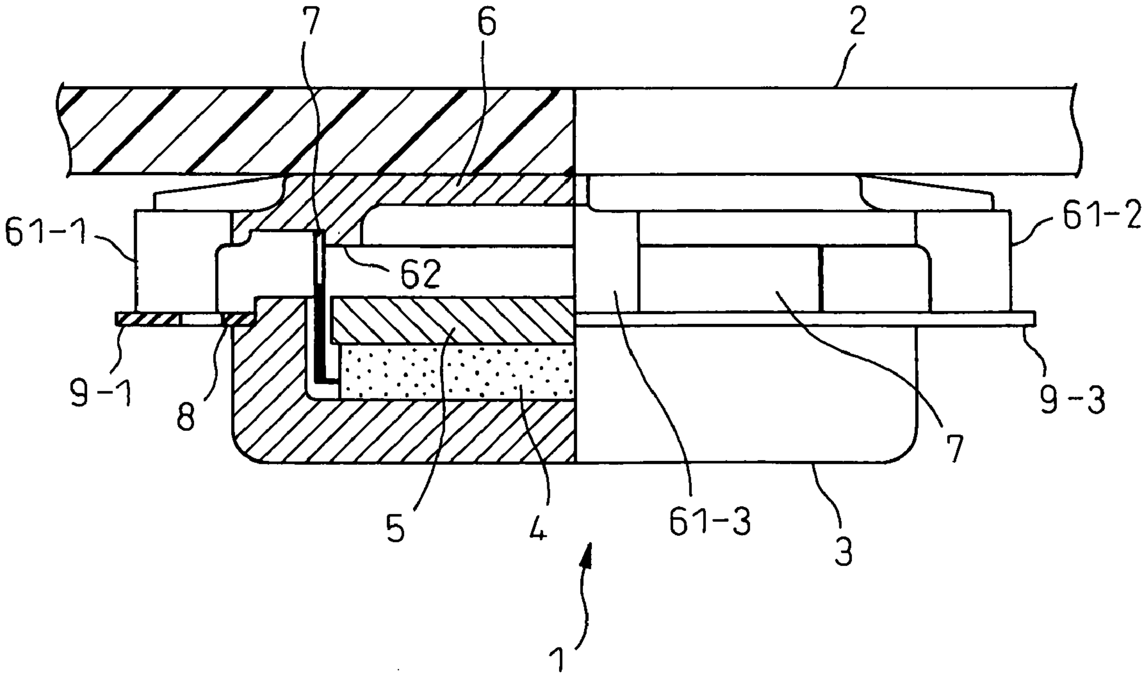
FIG. 5 is a view for explaining the configuration of an exciter for directly vibrating a board.

FIG. 5 is a side view of an exciter 1. The exciter 1 is for example shown in the state directly attached to an interior panel 2 of a vehicle. In the figure, the left half of the exciter 1 from the center is shown by a longitudinal cross-section. The exciter 1 is provided with a dish-shaped outside yoke 3 having a recessed part formed by a side wall and a bottom connected with each other, a disk-shaped permanent magnet 4 attached to the bottom, and a disk-shaped inside yoke 5 carried on the permanent magnet 4 and somewhat larger than the permanent magnet 4. A clearance is provided between the inner circumference of the side wall of the outside yoke 3 and the outer circumference of the inside yoke 5. The outside yoke 3, the permanent magnet 4, and the inside yoke 5 form a magnetic circuit.

This exciter 1 is provided with a coupler member 6 for attachment to the interior panel 2. The coupler member 6 is provided with a plurality of elastic member supports 61-1 to 61-3 for vibratably supporting the magnetic circuit unit comprised of the outside yoke 3, permanent magnet 4, and inside yoke 5 with respect to the coupler member 6.

Figure 6:
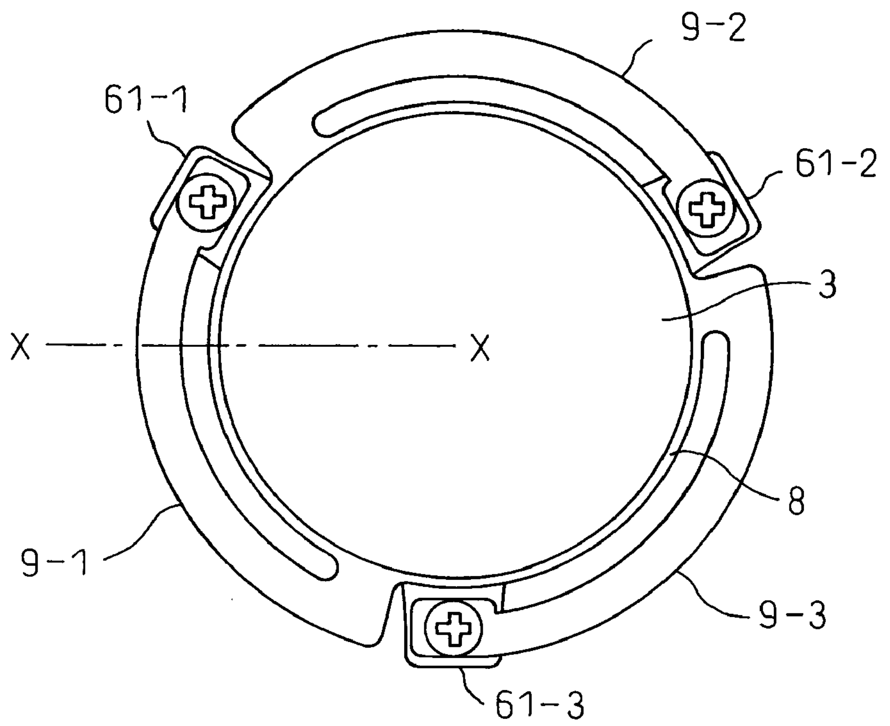
FIG. 6 is a plan view of an exciter for directly vibrating a board seen from the bottom side of the outside yoke.

FIG. 6 is a plan view of the exciter 1 seen from the outside yoke 3 side. The cross-section along the line X—X shown here corresponds to the longitudinal cross-section shown in FIG. 5. In the exciter 1 shown in FIG. 6, three elastic member supports 61-1 to 61-3 are provided, but the number is not limited to three. FIG. 5 shows elastic members 9-1 to 9-3 for elastically supporting the outside yoke 3 and the coupler member 6. These elastic members 9-1 to 9-3 are elastic pieces formed integrally with an elastic member mount 8 fastened to the rim of the side wall of the outside yoke 3. The tip of each is screwed to the corresponding one of the elastic member supports 61-1 to 61-3.

As shown in FIG. 5, a cylindrically shaped bobbin 7 around which a coil is wound is fastened to a ring-shaped projection 62 provided at the coupler member 6. Note that the coil wound around the bobbin 7 is shown by the black parts in the figure. Further, the coil is inserted into the clearance formed between the inside surface of the side wall of the outside yoke 3 and the outer circumference of the inside yoke 5. When this coil is supplied with a drive signal, the action of the magnetic circuit formed causes vibration to occur corresponding to the frequency of the drive signal. This vibration is transmitted through the coupler member 6 to the interior panel 2.

The interior panel 2 is usually formed by a material such as urethane or polypropylene foam, so the interior panel 2 itself can act as a vibration board. Therefore, if the coil is given a drive signal, the interior panel 2 is made to vibrate through the coupler member 6 connected to the bobbin 7 around which the coil is wound and a sound corresponding to the frequency of the signal can be generated.

By using the interior panel 2 as a vibration board in this way, formation of a good sound field becomes possible. Further, while the exciter 1 shown in FIG. 5 is attached to the bottom surface of the interior panel 2, the exciter 1 can give similar effects as a speaker using an exciter for directly vibrating a board even if attached to the top surface of the interior panel 2. Further, such an exciter may also be directly attached to a board other than an interior panel of a vehicle to form a panel type speaker.

The coupler member of the exciter for directly vibrating a board, as shown in FIG. 5, is for example directly fastened on the surface of a board such as an interior panel used in a vehicle so as to form a speaker. When for example the exciter is damaged and the speaker no longer functions etc., it is not possible to replace only the exciter. Therefore, just the exciter is made able to be replaced by fastening a bracket member to the board in advance, attaching the exciter through this bracket member, and having the exciter drive vibration of the board through the bracket member. The case of attaching an exciter through a bracket member is shown in FIG. 7.

Figure 7:
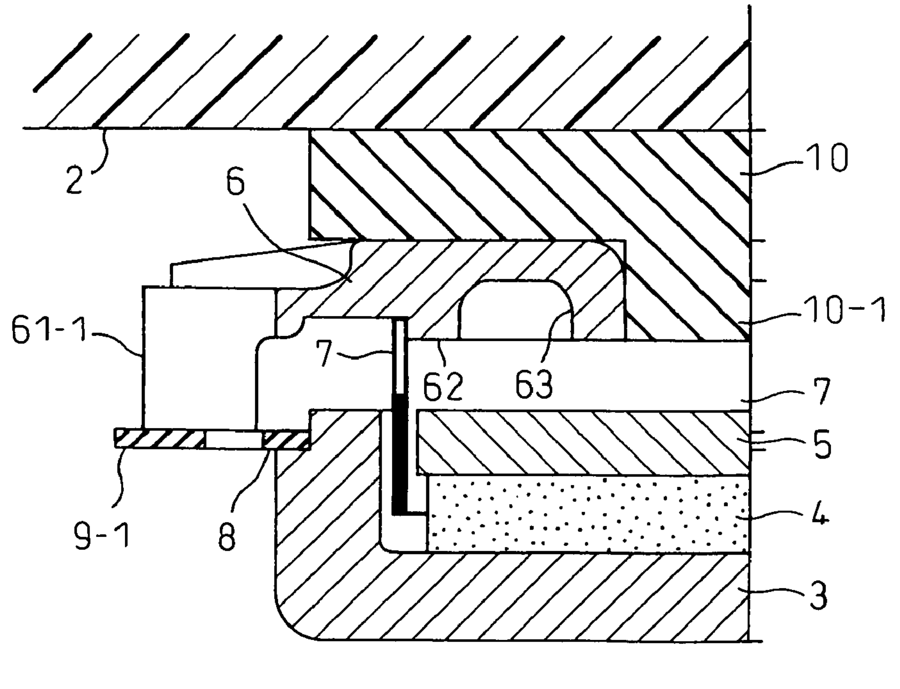
FIG. 7 is a view for explaining a state where an exciter for directly vibrating a board is attached to an interior panel of a vehicle through a bracket member.

In FIG. 7, like in FIG. 5, the left half of the exciter 1 is shown by a longitudinal cross-section. The basic configuration of the exciter is similar to the previous case. The exciter 1 shown in FIG. 7 differs from that shown in FIG. 5 in that at the center of the coupler member 6, a mount comprised of a screw socket 63 is formed integrally with the coupler member 6. The inside surface of the screw socket 63 is formed with a female thread. Further, the disk-shaped bracket member 10 is provided at its center with a screw projection 10-1. The outer surface of the projection is formed with a male thread.

Here, the bracket member 10 is for example fastened to the surface of the interior panel 2 of a vehicle. When attaching the exciter 1 to the interior panel 2, the screw socket 63 formed at the coupler member 6 and the screw projection 10-1 of the bracket member 10 are aligned and the exciter 1 is turned to fasten and mount it.

However, as explained above, if using the method of attachment of the exciter to a board explained here, the fastening torque when mounting the exciter 1 will not become uniform or a sufficient fastening torque will not be obtained and the insufficient fastening at the time of mounting the exciter will lead to loose engagement and degrade the performance of the speaker. Further, the exciter may also fall off.

Even if using a work tool such as a wrench at the time of mounting, the only place for the ends of the work tool to be brought into abutment is the outer circumference of the outside yoke of the exciter. The ends of the work tool end up slipping at the outer circumference, so sufficient fastening torque cannot be obtained. Further, if too strongly fastening the exciter—not only when attaching it but also when detaching it for replacement, the ends of the work tool will slip at the outer circumference of the outside yoke and therefore the exciter will not be able to be turned.

Therefore, the exciter for directly vibrating a board of the present invention, in view of these problems, enables a work tool to be used to obtain sufficient rotational torque by providing engagement means enabling engagement with an end of the work tool. Next, embodiments of the exciter for directly vibrating a board according to the present invention will be explained with reference to FIGS. 1A and 1B to FIG. 6. Three embodiments will be explained—differing in method of engagement of the engagement means provided at the exciter and the work tool when mounting the exciter on a bracket member attached to the board or when detaching the mounted exciter from the bracket member.

First Embodiment

The exciter for directly vibrating a board according to the first embodiment is similar to the exciter 1 shown in FIG. 5 and FIG. 6. In the first embodiment, engagement means gripped by engagement with a work tool when mounting or detaching the exciter 1 are formed at the outer circumference of the side wall of the outside yoke 3 of the exciter 1. The engagement means comprise flat surfaces formed by grinding down parts of the outer circumference of the side wall.

Figure 1A:
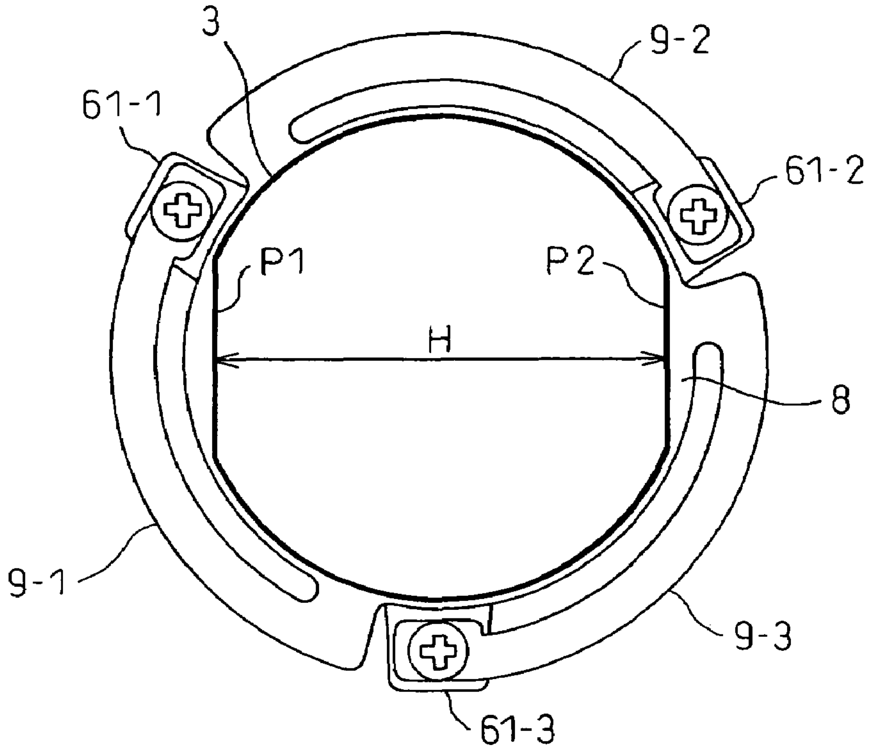
FIGS. 1A and 1B are views for explaining the provision of abutment faces for ends of a work tool at an outer circumference of an outside yoke in an exciter according to a first embodiment of the present invention.

The state of formation of the engagement means at the outer circumference of the side wall of the outside yoke 3 of the exciter 1 is shown in FIG. 1A. The figure shows the state as seen from the bottom of the outside yoke 3 of the exciter 1. This is similar to the exciter 1 shown in FIG. 6. The same parts are assigned the same reference number. In FIG. 1A, the outside yoke 3 is shown by the bold line. As engagement means, two parallel facing flat surfaces P1 and P2 are formed.

Figure 1B:
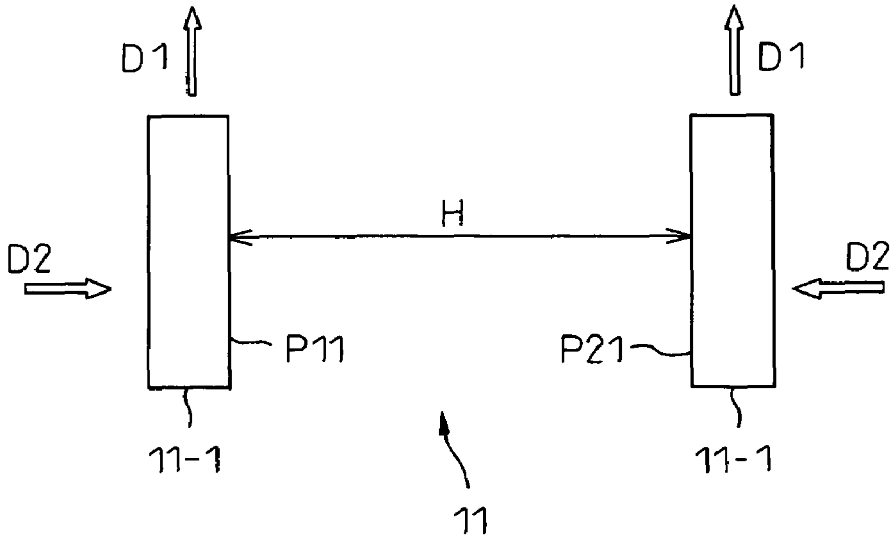

On the other hand, FIG. 1B shows the configuration of a work tool. The work tool 11 is provided with two ends 11-1 at the tip of its main body. The inside surfaces of the ends 11-1 are designed to abut against the two flat surfaces P1 and P2 formed at the outside yoke 3. The two ends 11-1 may be fixed in distance from each other at the tip of the main body or may be designed to be adjustable in distance. Further, the two ends may also have some play with respect to the two flat surfaces having the width H between them.

Here, as an example when mounting the exciter 1 to the bracket member or when detaching the mounted exciter 1, in the case of a work tool 11 with a distance between the ends fixed to the width H between the flat surface P1 and the flat surface P2, as shown in FIG. 1B, the work tool 11 is placed to insert the ends 11-1 in the direction D1 at the side surfaces of the exciter 1 and bring them into abutment with the two flat surfaces P1 and P2, then the work tool 11 is turned in the direction to fasten or to detach the exciter 1.

Further, as another example, when the distance between the ends 11-1 of the work tool 11 is adjustable, as shown in FIG. 1B, the work tool 11 is placed so that the two ends 11-1 are positioned straddling the two flat surfaces P1 and P2, then the ends 11-1 are moved in the direction D2 to adjust the distance to the width H and bring them into abutment with the two flat surfaces P1 and P2. Then, the work tool 1 is turned in the direction to fasten or to detach the exciter 1.

Note that as the engagement means of the exciter 1 shown in FIG. 1A, the explanation was given of formation of a pair of facing flat surfaces P1 and P2 at the outer circumference of the outside yoke 3. The flat surfaces are formed so as to prevent the two ends 11-1 of the work tool 11 from slipping when gripping the outside yoke 3 of the exciter 1 when the work tool 11 is turned. So long as there is sufficient contact area between an end and a flat surface, however, there is no need for two flat surfaces to be formed at the outside yoke; a single one may also be formed.

In this case, if assuming use of the work tool 11 shown in FIG. 1B, one of the two ends 11-1 is made to abut against the one flat surface formed at the outside yoke, while the other is made to abut against the part at the side facing the flat surface at the outer circumference of the side wall of the outside yoke. By using these two ends to grip the outside yoke, it is possible to generate the required fastening torque or detachment torque without slipping when turning the work tool 11.

Note that when the engagement means formed on the outside yoke 3 of the exciter 1 are comprised of one flat surface or two flat surfaces as explained above, the inconvenience arises that the directions by which the two ends 11-1 of the work tool 11 abut against the flat surfaces P1 and P2 are limited. A modification of the engagement parts for improving on this point is shown in FIG. 2A.

Figure 2A:
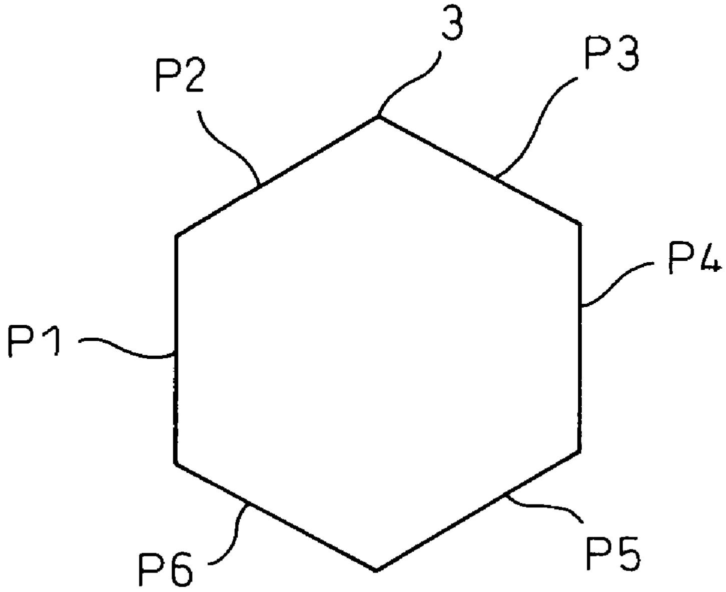
FIGS. 2A and 2B are views for explaining a modification of the exciter of the first embodiment.

FIG. 2A shows just the shape of the bottom of the outside yoke 3 of the exciter 1. The engagement means shown in FIG. 2A comprises three pairs of facing flat surfaces for contact with the two ends 11-1 of the work tool 11, that is, the flat surfaces P1 and P4, the flat surfaces P2 and P5, and the flat surfaces P3 and P6. There may also be two pairs or four pairs provided.

Figure 2B:
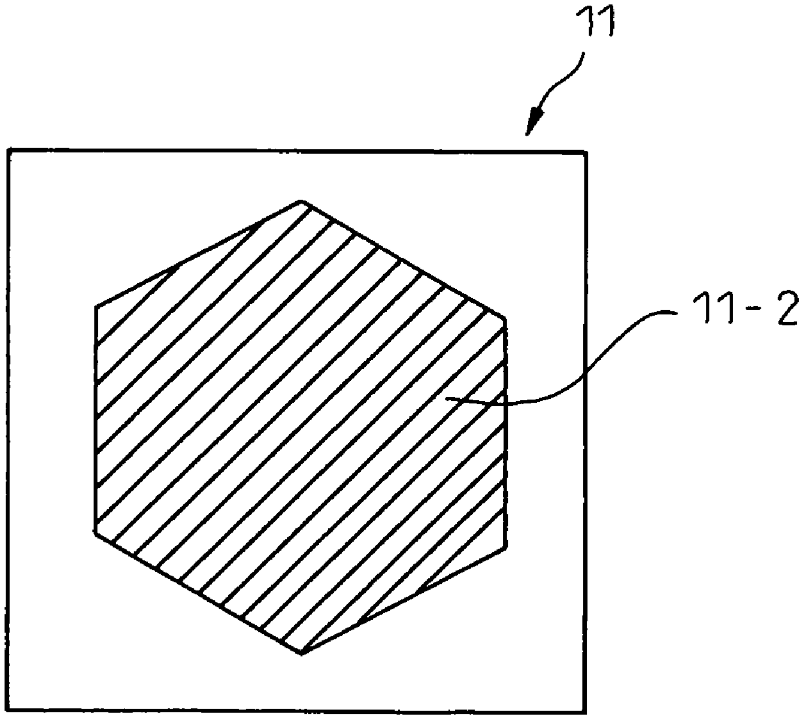

Further, the work tool 11 shown in FIG. 1B had two ends 11-1 provided at the tip of the main body, but the work tool 11 shown here may also be applied to the case of engagement means comprising the three pairs of flat surfaces shown in FIG. 2A. Further, as shown in FIG. 2B, the tip of the work tool 11 may be provided with an end 11-2 formed with a recess matching the shape of the three pairs of flat surfaces comprising the engagement means, that is, the outside shape of the outside yoke 3. The inside surfaces of the recess contact the flat surfaces formed at the outside yoke 3. The work tool 11 in this case may also be applied to the exciter 1 shown in FIG. 1A by making the shape of the end match the outside shape of the outside yoke 3.

By forming a plurality of pairs of facing flat surfaces at the outer circumference of the outside yoke 3 of the exciter 1 in this way, it is possible to increase the directions of abutment of the ends 11-1 of the work tool 11, so a sufficient rotational torque can be obtained and also the work of attachment of the exciter 1 to the board or the work of detachment of the exciter 1 becomes easy.

Note that the engagement means of the exciter explained up to here were basically flat surfaces, but instead of flat surfaces, it is also possible to form a plurality of relief shapes at the outer circumference of the outside yoke. It is further possible to provide relief shapes corresponding to these shapes at the ends of the work tool. By doing this, there is the same effect as if the engagement means comprised flat surfaces. Further, the ends of the work tool can grip the outer circumference of the outside yoke from any direction and, in the turning work, a sufficient rotational torque can be obtained without slipping.

Second Embodiment

Figure 3A:
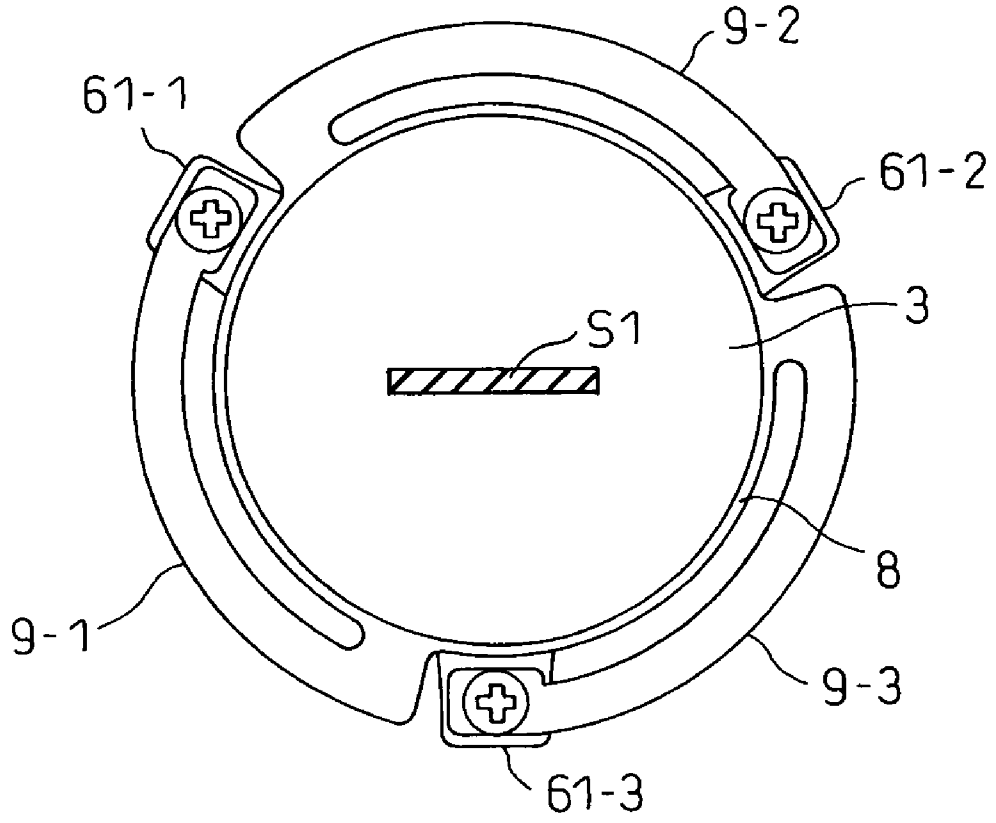
FIGS. 3A and 3B are views for explaining the provision of slits for insertion of an end of a work tool at the bottom of an outside yoke in an exciter according to a second embodiment of the present invention.

The engagement means in the exciter for directly vibrating a board according to the second embodiment are shown in FIG. 3A. In the first embodiment, the engagement means with which the ends of the work tool engaged were formed at the outer circumference of the outside yoke of the exciter. As opposed to this, in the second embodiment, the engagement means are formed at the bottom of the outside yoke of the exciter. The engagement means in this case basically comprises a narrow groove with which the end of a work tool can engage.

The exciter for directly vibrating a board shown in FIG. 3A is similar in configuration to the exciter for directly vibrating a board shown in FIG. 6. The same parts are assigned the same notations. The engagement means of the exciter of FIG. 3A comprise a single long groove S1 at the bottom of the outside yoke 3 of the exciter 1. The length of the groove S1 is selected so that a sufficient torque is obtained when the end of a work tool 11 is engaged with it and the tool is turned. The groove S1 may penetrate through the bottom to face the permanent magnet 4, but in the case of such a groove, when bonding the permanent magnet 4 to the outside yoke 3, the adhesive may enter into the groove. Therefore, the groove S1 is preferably one of a suitable depth not penetrating through the bottom.

Figure 3B:
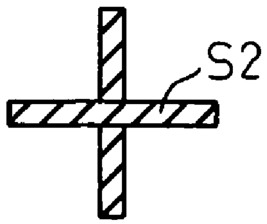

The engagement means shown in FIG. 3A comprises a single groove, but as shown in FIG. 3B, it is also possible to form grooves S2 in a cross shape like the head of a plus screwdriver.

If forming a single groove S1 or cross-shaped grooves S2 at the bottom of the outside yoke 3 of the exciter 1 in this way and forming the end of the work tool 11 to a line shape like that of the head of a screwdriver for line recessed head screw or to a cross shape like that of the head of a screwdriver for cross recessed head screw, when mounting or detaching the exciter, by engaging the end of the work tool with the engagement means of the exciter and turning the work tool, a sufficient rotational torque can be obtained and also the work of attachment of the exciter 1 to the board or the work of detachment of the exciter 1 becomes easy.

Third Embodiment

Figure 4:
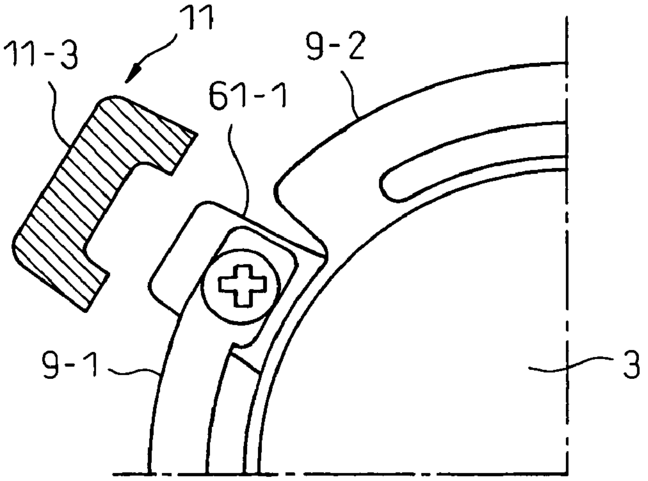
FIG. 4 is a view for explaining the provision of elastic support members to which ends of a work tool are engaged in an exciter according to a third embodiment of the present invention.

The engagement means in an exciter for directly vibrating a board according to a third embodiment are shown in FIG. 4. In the first embodiment and second embodiment, the engagement means with which the ends of the work tools engaged were formed at the outer circumference or bottom of the outside yoke of the exciter. As opposed to this, in the third embodiment, the engagement means are formed not at the outside yoke of the exciter, but at the coupler member provided with elastic member supports for supporting the vibratable elastic members of the magnetic circuit unit.

The exciter for directly vibrating a board shown in FIG. 4 is similar in configuration to the exciter for directly vibrating a board shown in FIG. 6. The same parts are assigned the same reference numbers. Note that in FIG. 4, a quarter of the exciter shown in FIG. 6 is shown enlarged. The engagement means of the exciter of FIG. 4 utilize the elastic member supports 61-1 to 61-3 supporting the elastic members 9-1 to 9-3 able to vibrate the magnetic circuit unit.

The elastic member supports 61-1 to 61-3 shown in FIG. 4 are formed larger than the elastic member supports 61-1 to 61-3 shown in FIG. 6 and are provided with parts projecting out long to the outside.

The tip of the work tool 11 is provided with three ends 11-3 at positions corresponding to the elastic member supports 61-1 to 61-3. Further, as shown in FIG. 4, the ends are formed with grooves at their inside surfaces. When mounting the exciter 1 to the bracket member 10 or when detaching the exciter 1, the projecting parts of the elastic member supports 61-1 to 61-3 are slid into the grooves formed at the ends of the work tool 11 for engagement. In this state, the work tool 11 can be turned to mount the exciter 1 to the bracket member 10 or detach the exciter 1.

In this way, when mounting or detaching the exciter, by engaging the ends of the work tool with the engagement means of the exciter, that is, the projecting parts, and turning the work tool, sufficient rotational torque can be obtained and also the work of attachment of the exciter 1 to the board or the work of detachment of the exciter 1 becomes easy.

Note that while the elastic member supports provided at the coupler member were used for the projecting parts for engaging with the ends of the work tool, the projecting parts may also be integrally formed with the coupler member at positions other than the elastic member supports. Further, in FIG. 4, the engagement means of the exciter were shown as projecting parts, but it is also possible to apply the method of formation of engagement means by flat surfaces or grooves shown in the first embodiment or the second embodiment to the coupler member. Not only can a sufficient rotational torque be obtained, but also the work of attachment of the exciter to the board or the work of detachment of the exciter becomes easy.

While the invention has been described with reference to specific embodiments chosen for purpose of illustration, it should be apparent that numerous modifications could be made thereto by those skilled in the art without departing from the basic concept and scope of the invention.

What is claimed is:

1. An exciter for directly vibrating a board comprising:

a magnetic circuit unit having a dish-shaped outside yoke comprised of a side wall and a bottom connected with each other, a permanent magnet fastened to said bottom, and an inside yoke placed on said permanent magnet and provided with a clearance from said side wall;

a coil wound around a bobbin and inserted into said clearance causing said board to vibrate when a drive signal is supplied thereto; and a coupler member fastening said bobbin and provided with supports for supporting an elastic member connected to said magnetic circuit unit; wherein said coupler member having a mount for attachment to a bracket member attached to the surface of the board, and engagement means capable of engaging with a work tool being provided on an outside surface of said outside yoke for attachment/detachment of said coupler member with respect to said bracket member.

2. An exciter for directly vibrating a board as set forth in claim 1, wherein said engagement means comprises at least one flat surface formed at an outer circumference of said side wall of said outside yoke, and when mounting said coupler member to or detaching it from said bracket member, the at least one flat surface is gripped by being brought into abutment with a flat surface of an end of said work tool and said work tool is turned to attach/detach said coupler member with respect to said bracket member.

3. An exciter for directly vibrating a board as set forth in claim 2, wherein said engagement means comprises at least one pair of parallel facing flat surfaces.

4. An exciter for directly vibrating a board as set forth in claim 1, wherein said engagement means comprises at least one groove formed at an outside surface of said bottom of said outside yoke, and when mounting said coupler member to or detaching it from said bracket member, said at least one groove receives an end of said work tool and said work tool is turned to attach/detach said coupler member with respect to said bracket member.

5. An exciter for directly vibrating a board as set forth in claim 4, wherein said at least one grove is formed in a cross shape.

6. An exciter for directly vibrating a board as set forth in claim 1, wherein said engagement means comprises projecting parts formed at a plurality of elastic member supports supporting said elastic member and provided at said coupler member, and when mounting said coupler member to or detaching it from said bracket member, said projecting parts are engaged with grooves provided at ends of said work tool and said work tool is turned to attach/detach said coupler member with respect to said bracket member.

* * * * *